United States Patent Office 3,297,548
Patented Jan. 10, 1967

3,297,548
PREPARATION OF ACID PHYTASE
James H. Ware, Lake Bluff, and Tsuong R. Shieh, Chicago, Ill., assignors to International Minerals & Chemical Corporation, a corporation of New York
No Drawing. Filed July 28, 1964, Ser. No. 385,774
14 Claims. (Cl. 195—66)

This invention relates to the preparation of acid phytase and more particularly relates to the preparation of acid phytase utilizing microorganisms.

Many species of plants contain appreciable amounts of phosphorus chemically combined with organic molecules. Thus, for example, in addition to the phosphorus content of nucleic acids, phosphorus also is present as phytin phosphorus. When material of plant origin is fed to mono-gastric animals (i.e., poultry, swine, dogs, cats and the like) the animals generally are capable of utilizing the carbohydrate and protein content. These animals, however, are incapable of digesting significant amounts of phytin phosphorus and, therefore, cannot utilize phytin phosphorus as supplied in the plant material. Such plant material includes cereal grains and by-products such as corn meal, wheat bran, rice bran; oilseed meals such as cottonseed meal, soybean meal and linseed meal; and the like. The enzyme termed acid phytase is capable of converting the phytin phosphorus of the plant to assimilable phosphate and, therefore, phytase may be added to animal feeds before ingestion, so that the bound phosphorus content of the feed will be liberated and made available to the animal. Conversion of the bound phosphorus to assimilable phosphate may occur either before or after ingestion.

It is a primary object of this invention to provide a method for the preparation of acid phytase.

It is a further object of this invention to provide a method for the preparation of acid phytase employing microorganisms.

It is a still further object of this invention to provide a method for the preparation of acid phytase wherein microorganisms are cultured in a medium which is controlled to provide a maximum yield of acid phytase.

In accordance with this invention an acid phytase-producing microorganism is aerobically cultured in a medium containing a carbon source, a nitrogen source and inorganic salts, the available orthophosphate content of the medium being controlled at less than about 0.005% and preferably at less than about 0.004% by weight of phosphorus in the medium, whereby the production of acid phytase is enhanced.

By limiting the available orthophosphate content of the medium it has been discovered that the accumulation of acid phytase is increased. Since additional amounts of orthophosphate in the medium increase the density of cell population, optimum acid phytase accumulation occurs under suboptimum growth concentrations of available orthophosphate.

The present invention broadly contemplates the utilization of acid phytase-producing microorganisms. Such microorganisms may be bacteria, fungi or yeast. Thus, for example, fungi of the genera, Aspergillus, Penicillium, Mucor and Rhizopus, yeasts of the genera Hansenula and Saccharomyces and bacteria of the genera Escherichia produce acid phytase. More particularly, producing microorganisms may be found, interalia, in the species *Aspergillus niger, A. oryzae, A. flavus, A. flavipes, A. melleus, A. giganteus, A. parasiticus, A. phoenicis, A. tamarii, A. nidulans, A. repens, A. clavatus, A. terreus, A. saitoi, A. awamori, Hansenula subpelliculosa, Saccharomyces cerevisiae,* and *Escherichia coli.* Fungi are preferred for the practice of this invention and *A. niger* is particularly preferred for the practice of this invention. Acid phytase-producing microorganisms are described, inter alia, in "Bulletin of the Agricultural Chemical Society of Japan," 5, pp. 7–8 (1929); "Soil Science," 87 (6), p. 305 (1959); and, "Poultry Science," 41, (3), p. 725 (1962).

As employed herein, the term "acid phytase" embraces that enzyme activity which, at a pH between about 2 to about 7, will liberate at least some of the phosphorus from phytin as orthophosphoric acid.

The fermentation medium for the production of acid phytase corresponds generally to standard nutrient media and contains a suitable carbon source, a nitrogen source, auxiliary growth factors if desired, and inorganic salts. The fermentation may be accomplished under submerged aerobic conditions in a liquid medium or as a surface culture.

The carbohydrate employed includes sugars, dextrins, starches and the like. Thus, the medium may contain a sugar, such as glucose, sucrose, fructose, maltose, arabinose and the like, as well as mixtures of such sugars or a starch such as cornstarch, wheat starch, corn meal, cereal grains and derivatives, and the like. As employed herein, the terms "sugar" and "starch" embrace not only such materials, per se, but their obvious equivalents. For example, the term "glucose" embraces materials such as "Cerelose" (Corn Products Company) and "Clintose" (Clinton Corn Processing Company), which are commercially available forms of glucose monohydrate prepared by hydrolysis of cornstarch. The terms also embrace invert sugar mixtures, such as those prepared by acid conversion of sugars in a known manner. The particular carbohydrate chosen for any given fermentation will obviously depend in part upon the microorganism employed. Alternatively, other carbon sources such as protein, hydrocarbons and the like may be employed.

The carbon source desirably is employed in the liquid fermentation medium in amounts of at least about 0.1% and may be present in amounts up to 20% and higher. Preferably, the aqueous medium will contain at least about 2% and most desirably at least about 5% by weight of the carbohydrate. The precise proportion of carbohydrate employed in the medium and whether it is added once at the outset or incrementally throughout the fermentation will be a matter of choice depending upon the microorganism employed and fermentation conditions.

The medium also will contain a standard nitrogen source, such as ammonia, urea, protein, or other assimilable nitrogen sources, either organic or inorganic. Various ammonium compounds can be used, including chloride, sulfate and the like. Total nitrogen sources can be added at the outset or can be added periodically during the fermentation.

Suitable sources of auxiliary growth factors which may be used alone or in combination include meat extract, peptone, corn steep water, beet molasses, sugar cane molasses, and the like. It will be apparent that vitamins or amino acids also can be added as such to the medium.

A variety of calcium, potassium, and magnesium salts may be employed in the fermentation medium including the chlorides, sulfates, and the like. Similarly, sulfate ions can be supplied as any of a variety of salts. While salts which supply both the anion and cation may be employed (e.g., magnesium sulfate) the selection is by no means so limited. So called "minor elements" are understood to include manganese, iron, zinc, cobalt and possibly others and trace quantities of these materials are often desirable in the medium. Frequently such quantities are present in other materials used in the preparation of the fermentation medium.

Finally, the medium will contain a non-toxic alkali or buffer to maintain the pH in the desired range. Once more, a wide variety of known non-toxic materials may be utilized. Because they are readily available, calcium carbonate or ammonia (gaseous or aqueous) often are employed to maintain the pH of fermentation mediums. The total amount of buffer can be added at the outset of the fermentation or, alternatively, the buffer can be added periodically throughout the fermentation to maintain the pH within the desired range.

The pH of the medium generally will be maintained between about 1 and about 9 and preferably between about 2 and about 7. The temperature of the medium generally will be maintained between about 15 and about 40° C. and preferably between about 25 and about 35° C. When submerged fermentation is employed the medium is agitated and aerated to provide optimum culturing conditions for the microorganism.

It will be apparent that the selection of a particular carbon source, nitrogen source and combination of inorganic salts as well as the selection of fermentation conditions will depend in part upon the particular microorganism employed in the process. The selection of such preferred materials and conditions is within the skill of the art.

As indicated earlier, the fermentation can be conducted as a submerged, aerobic fermentation or it can be conducted as a surface culture. In the latter case, the content of the carbon source (e.g., a carbohydrate), is substantially increased and is present in admixture with the nitrogen source, buffer, inorganic salts, auxiliary factors, and the like. Once again, surface cultures are known to the art and the formulation of such media is within the skill of the art.

The available orthophosphate content of the medium is maintained during the fermentation at a level that is suboptimal for the growth of the microorganism. Since microorganisms require phosphorus as an essential growth element, a minute minimum level must be present in the fermentation medium. Generally, the initial phosphorus content of the medium will be at least about 0.0001%. The presence of excessive amounts of orthophosphate, however, substantially adversely affects the production of acid phytase and, therefore, the orthophosphate content of the medium (calculated as phosphorus) is maintained at less than about 0.005% by weight of the medium. In determining the orthophosphate content of the medium the available orthophosphate content of all components of the medium must be considered. The available orthophosphate content of the medium can be determined employing the method of Fiske and Subbarow, J. Biol. Chem., 66, p. 375 (1925).

Available orthophosphate most appropriately may be added to the medium as a soluble inorganic orthophosphate salt. Potassium phosphates, sodium phosphates, ammonium phosphates, calcium phosphates and the like readily may be employed. Materials such as cornstarch, corn meal and the like contain various forms of inorganic orthophosphate as well as organic phosphorus which may be slowly released into the medium as available phosphate. Indeed, the available phosphorus released by corn meal and the like may be sufficient to provide attractive acid phytase yields. For this reason, corn meal is a preferred carbohydrate for the practice of this invention.

Acid phytase activity may be measured as follows: In the event extracellular acid phytase activity is to be measured, the final whole culture is filtered and 0.1 ml. of culture filtrate is mixed with 0.9 ml. of 0.1 M acetate buffer (pH 4.5) containing 0.5 mg. of calcium phytate. The mixture is incubated at 37.5° C. for a suitable time which may be 24 hours or longer and the orthophosphate liberated is determined by the method described in J. Biol. Chem., 66, p. 375 (1925). In the event the acid phytase activity of the entire culture is to be measured, 2 ml. of culture suspension are mixed with 8 ml. of 0.1 M acetate buffer (pH 4.5) containing 5 mg. of calcium phytate. The mixture is incubated at 28° C. with agitation and aeration (e.g., on a rotary shaker) for 30 minutes and the orthophosphate content of 1 ml. of the filtrate is measured by the above method.

The fermentation contemplated by the present invention generally will continue until the acid phytase activity reaches a maximum. This may require from 12 to 120 hours. Generally, yeasts tend to provide a maximum acid phytase enzyme concentration more quickly than processes employing molds. It will be apparent that the point of maximum production readily can be determined employing the above assay methods.

Following the fermentation, a variety of means are available for the recovery of the acid phytase. In the event the phytase enzyme is intracellular, the cells may be recovered by filtration, centrifugation, or the like, and dried. In the event the phytase enzyme is substantially extracellular, the filtrate following the removal of cells may be concentrated as, for example, by heating at 55–70° C. under vacuum to provide a concentrated enzyme which may be employed in liquid form or which may be added to a solid carrier. In some instances it will be desirable to concentrate the entire medium without first separating it into component parts. Other methods such as solvent fractionation, spray drying and the like may also be employed.

The following examples are included in order more fully to demonstrate the practice of this invention. These examples are included for illustrative purposes only and in no way are intended to limit the scope of the invention.

In these examples, phytase activity was measured in accordance with the above method employing a 30 minute incubation period. The acid phytase activity is defined in units of enzyme per ml. of enzyme preparation. A unit of enzyme, in turn, is defined as that amount of enzyme which liberates 1 mg. of phosphorus per hour under the defined conditions.

EXAMPLE I

A fermentation medium was prepared having the following composition.

| Medium: | Gm./liter |
|---|---|
| Glucose | 60 |
| $NaNO_3$ | 8.6 |
| $MgSO_4 \cdot 7H_2O$ | 0.5 |
| KCl | 0.5 |
| $FeSO_4$ | 0.001 |
| pH, 7.3. | |

Phosphate was added as potassium orthophosphate to this medium in various concentrations. The fermentation medium was subdivided into 50 ml. proportions which were placed in 250 ml. flasks. *Aspergillus niger* (NRRL 3135) was inoculated and incubated at 28° C. on a rotary shaker. At the end of five days, the acid phytase activity of the fermentation liquor and the dry mycelial weight were determined. Table I shows the effect of phosphate on acid phytase activity and growth in a glucose medium:

*Table I*

| Available P in Medium (percent) | Activity | Dry cell wt. g./50 ml. |
|---|---|---|
| 0 | 0 | 0 |
| 0.0002 | 0.2 | 0.039 |
| 0.0005 | 0.28 | 0.069 |
| 0.001 | 0.16 | 0.115 |
| 0.003 | 0.06 | 0.184 |
| 0.005 | 0.02 | 0.190 |
| 0.01 | Trace | 0.364 |

Table I demonstrates that the production of acid phytase becomes maximum when the phosphorus content of the medium is between 0.0002 to 0.005%.

EXAMPLE II

The process of Example I was repeated except that 4% and 8% of cornstarch was employed as the carbohydrate and the phosphate concentration was varied by the addition of potassium orthophosphate.

*Table II*

CORNSTARCH 4%

| Available P in medium (percent) | Activity |
|---|---|
| 0.00044 | 1.26 |
| 0.00104 | 1.46 |
| 0.00204 | 1.32 |
| 0.00304 | 1.30 |
| 0.00404 | 0.9 |
| 0.00504 | 0.32 |
| 0.00604 | 0.12 |
| 0.00804 | 0.12 |

CORNSTARCH 8%

| | |
|---|---|
| 0.00048 | 4 |
| 0.00108 | 5.8 |
| 0.00208 | 6.6 |
| 0.00308 | 6.0 |
| 0.00408 | 5.2 |
| 0.00508 | 4.8 |
| 0.01008 | 0.56 |

Table II demonstrates that the optimum phosphorus concentration for acid phytase production will vary somewhat depending upon carbohydrate concentration.

EXAMPLE III

The process was identical to that of Example I except that 10% of yellow corn meal was used and no phosphate or $NaNO_3$ was added. The medium contained about 0.005% phosphorus as available orthophosphate. An acid phytase activity of 12 was obtained after 4 days' culture. When 0.018% of phosphorus was added as potassium orthophosphate to increase the available phosphorus in the medium to 0.023%, the acid phytase activity was reduced to 0.24.

EXAMPLE IV

The process was identical to that of Example III, except that *Aspergillus niger* (ATCC 9142) was employed. After 4 days' fermentation an acid phytase activity of 7.2 was obtained.

EXAMPLE V

The process was identical to that of Example III, except that *Aspergillus awamori* (ATCC 11382) was employed. After 4 days' fermentation an acid phytase activity of 9.2 was obtained.

EXAMPLE VI

The process was identical to that of Example III, except that *Aspergillus saitoi* (ATCC 11362) was employed. After 4 days' culture an acid phytase activity of 9.6 was obtained.

EXAMPLE VII

Ten gm. of ground yellow corn and 10 ml. of water were mixed and placed into a petri dish. One ml. of spore inoculum of *Aspergillus niger* (NRRL 3135) was inoculated onto the substrate. This surface culture was incubated at 28° C. with occasional mixing using a spatula. After 5 days, the acid phytase was extracted with 50 ml. of cold water. The acid phytase activity of the extract was 4.8.

EXAMPLE VIII

| Media: | Gm./l. |
|---|---|
| Glucose | 10 |
| Malt extract | 3 |
| Yeast extract | 3 |
| Peptone | 5 |
| pH, 5.6. | |

Phosphate was added to this medium as potassium orthophosphate in various concentrations to provide a phosphorus content as shown. The fermentation medium was subdivided into 50 ml. in 250 ml. flasks, and 1 ml. of the inoculum of *Saccharomyces cerevisiae* (NRRL Y–6728) was inoculated. After 3 days' fermentation, the acid phytase activity of a cell suspension was determined. As shown in Table III, the increase in phosphorus resulted in inhibition of acid phytase activity.

*Table III*

| P content of the medium (percent) | Activity |
|---|---|
| 0.003 | 0.72 |
| 0.0039 | 0.58 |
| 0.0048 | 0.08 |
| 0.0120 | Trace |
| 0.021 | Trace |

EXAMPLE IX

The following fermentation medium was prepared.

| Medium: | Percent by weight |
|---|---|
| Glucose | 2 |
| $(NH_4)_2SO_4$ | 0.5 |
| MgSO | 0.05 |
| NaCl | 0.01 |
| KCl | 0.01 |

In addition, the medium contained trace quantities of the following minor elements: Boric acid, $CuSO_4$, KI, $FeSO_4$, $MnSO_4$, sodium molybdate, and $ZnSO_4$. The medium also contained trace quantities of the following vitamins: Niacin, $B_2$, folic acid, calcium, pantothenic acid, paraaminobenzoic acid, $B_6$, $B_1$, biotin and anocitol.

Equal portions of the above media were employed for fermentation at pH 6.5 for 4 days employing *Hansenula subpelliculosa* (NRRL Y–1683). The growth in the final media was measured by turbidity employing a No. 42 filter and a Klett colorimeter. The phosphorus content of the media was varied as shown in Table IV by the addition of appropriate amounts of $K_2HPO_4$.

*Table IV*

| Phosphorus | Activity | Turbidity |
|---|---|---|
| 0.00 | 0.00 | 13 |
| 0.0001 | 0.02 | 21 |
| 0.00015 | 0.06 | 30 |
| 0.0002 | 0.05 | 41 |
| 0.0003 | 0.08 | 62 |
| 0.0005 | 0.13 | 83 |
| 0.001 | 0.15 | 109 |
| 0.002 | 0.06 | 135 |
| 0.004 | 0.02 | 146 |
| 0.005 | 0.02 | 146 |
| 0.01 | 0 | 152 |

Since modifications of this invention will be apparent to those skilled in the art, it is intended that this invention be limited only by the scope of the appended claims.

We claim:

1. In the process of producing acid phytase wherein an acid phytase-producing microorganism is aerobically cultured in a medium containing a carbon source, a nitrogen source and inorganic salts, the improvement of maintaining an available orthophosphate content in the medium in the range of about 0.0001% to about 0.005% by weight determined as phosphorus whereby production of acid phytase is enhanced.

2. The process of claim 1 wherein the microorganism is a fungus.

3. The process of claim 1 wherein the microorganism is of the genus Aspergillus.

4. The process of claim 1 wherein the microorganism is of the species *Aspergillus niger*.

5. The process of claim 1 wherein the available orthophosphate content of the medium is maintained at less than about 0.004% by weight determined as phosphorus.

6. The process of claim 1 wherein the carbon source is corn meal.

7. The process of claim 1 wherein the microorganism is a yeast.

8. In the process of producing acid phytase wherein an acid phytase-producing microorganism is cultured under submerged aerobic conditions in a medium containing a carbon source, a nitrogen source and inorganic salts, the improvement of maintaining an available orthophosphate content in the medium in the range of about 0.0001% to about 0.005% by weight determined as phosphorus whereby production of acid phytase is enhanced.

9. The process of claim 8 wherein the microorganism is a fungus.

10. The process of claim 8 wherein the microorganism is of the genus Aspergillus.

11. The process of claim 8 wherein the microorganism is of the species *Aspergillus niger*.

12. The process of claim 8 wherein the available orthophosphate content of the medium is maintained at less than about 0.004% by weight determined as phosphorus.

13. The process of claim 8 wherein the carbon source is corn meal.

14. The process of claim 8 wherein the microorganism is a yeast.

References Cited by the Examiner

Journal of the Agriculture Chemical Society of Japan 12 (1936), pages 74–81.

Casida, L. E., "Soil Science" 87, 305–310 (1959).

A. LOUIS MONACELL, *Primary Examiner.*

L. M. SHAPIRO, *Assistant Examiner.*